United States Patent
Rothschild et al.

[19]

[11] Patent Number: 6,152,824
[45] Date of Patent: Nov. 28, 2000

[54] ONLINE GAMING ARCHITECTURE

[75] Inventors: Jeffrey Jackiel Rothschild; Marc Peter Kwiatowski, both of Los Gatos; Michael Andrew Wolf; Stephen Michael Grimm, both of Mountain View; Daniel Joseph Samuel, Sunnyvale; Norman Robert Henry Black, Half Moon Bay; Conrad Donald Wong, Los Altos Hills, all of Calif.

[73] Assignee: Mpath Interactive, Inc., Mountain View, Calif.

[21] Appl. No.: 09/036,583

[22] Filed: Mar. 6, 1998

Related U.S. Application Data

[60] Provisional application No. 60/040,640, Mar. 6, 1997.
[51] Int. Cl.[7] .............................. A63F 13/00; A63F 9/24; G06F 17/00; G06F 19/00
[52] U.S. Cl. ................................ 463/42; 463/40; 463/41; 463/29; 700/2; 700/3; 700/8; 700/9; 706/908; 706/909; 706/916
[58] Field of Search .................. 463/42, 40, 41, 463/29, 43, 44, 46, 47; 273/148 B; 700/91, 92, 94, 2, 3, 8, 9; 706/908, 909, 916

[56] References Cited

U.S. PATENT DOCUMENTS

| | | | |
|---|---|---|---|
| 5,214,703 | 5/1993 | Massey et al. | 380/37 X |
| 5,586,257 | 12/1996 | Perlman | 463/42 X |
| 5,775,996 | 7/1998 | Othmer et al. | 463/40 X |
| 5,796,393 | 8/1998 | MacNaughton et al. | 345/329 X |
| 5,828,843 | 10/1998 | Grimm et al. | 398/200.58 X |
| 5,838,909 | 11/1998 | Roy et al. | 395/200.39 X |
| 5,841,980 | 11/1998 | Waters et al. | 395/200.34 X |
| 5,956,485 | 9/1999 | Perlman | 395/200.34 X |
| 5,964,660 | 10/1999 | James et al. | 463/1 X |
| 5,996,022 | 11/1999 | Krueger et al. | 709/247 X |

*Primary Examiner*—Jessica J. Harrison
*Assistant Examiner*—Binh-An Nguyen
*Attorney, Agent, or Firm*—Wagner, Murabito & Hao LLP

[57] ABSTRACT

A networked computer online gaming system and process arranged in a client/server online gaming architecture and utilized to run gaming programs. The client computers are configured to run a gaming client program. The server computers are coupled to the client computers via a network. The server computers run server programs including a master control program (MCP) that governs access of the server programs to the online gaming architecture, a servorum program (SV) for creating instances of a server program, a matchmaker program (MM) that supports rendezvous services, a game instances class server program (GICS) that enables games and provides user to user communication, and game upper level protocol server program (GULP) that supports the user to user communication provided by said GICS.

23 Claims, 11 Drawing Sheets

ONLINE GAMING ARCHITECTURE

RELATED APPLICATIONS

This application claims the benefit of U.S. Patent Provisional Application Ser. No. 60/040,640, filed Mar. 6, 1997, entitled "ONLINE GAMING ARCHITECTURE" which is hereby incorporated by reference.

FIELD OF THE INVENTION

The present invention relates to the field of online computer gaming.

BACKGROUND OF THE INVENTION

The terms computer game and video game are taken to be synonymous. Prior art online computer gaming services such as those described in U.S. Pat. No. 5,586,257, entitled "Network Architecture To Support Multiple Site Real-Time Video Games", illustrate some of the advantages of using centralized server computer for bringing together players who wish to engage mutually in an online real-time multi-player computer game. This bringing together of players is termed rendezvous.

GENERAL

Referring to FIG. 1, a Client computer 1 (also known simply as a Client) which is a computer physically attended by a person who wishes to engage in online multiplayer games (using the System) becomes attached to an internetwork 5 such as the Internet, hereinafter referred to as the Net. This attachment is typically by way of modulator/demodulator (Modem) 2 dial-up on the Public Switched Telephone Network (PSTN) 3. Typically equipment at a point of presence (POP) 4 installed by an Internet Service Provider (ISP) connects the PSTN to the Internet. Similar arrangements apply in the cases where the Net is other than the Internet. Referring to FIG. 2., a slightly different alternative arrangement is possible wherein of a Terminal Adapter (TA) 6 is connected to some form of switched or unswitched digital data service 7 such as Integrated Services Digital Network (ISDN). The types of connections of Clients to Nets described above are well known in the art.

However earlier systems are less reliable, of lower performance, and are more susceptible to intentional disruption by unfriendly parties than would be the case with an improved design. Moreover, additional features can usefully be added to the rendezvous part of the online gaming system.

What is required is an online gaming architecture that provides a method of authenticating users. The online gaming architecture should provide a means of secure and efficient communications between the users and online gaming servers. It should also facilitate player matching and ensure that opportunities to cheat are minimized.

SUMMARY OF THE INVENTION

The present invention is a networked computer online gaming system and process that facilitates the connection of players and authenticates their identity in a client/server environment. The online gaming architecture of the present invention provides a means of secure and efficient communications between the users and online gaming servers. It also facilitates player matching and ensures that opportunities to cheat are minimized while increasing the opportunity to realize satisfying gaming entertainment.

In one embodiment, a networked computer on-line gaming system is arranged in a client/server online gaming architecture and utilized to run gaming programs. The Client computers are configured to run a gaming Client program. The Server computers are coupled to the Client computers via a network. The Server computers run Server programs including a Master Control Program (MCP) that governs access of the server programs to the online gaming architecture, a Servorum program (SV) for creating instances of a server program, a Matchmaker program (MM) that supports rendezvous services, a Game Instances Class Server program (GICS) that enables features of the online gaming architecture to be Utilized, and Game Upper Level Protocol server program (GULP) associated with said GICS.

DESCRIPTION OF THE DRAWINGS

The accompanying drawings which are incorporated in and form a part of this specification, illustrate embodiments of the invention and together with the description, serve to explain the principles of the invention.

BEST MODE FOR CARRYING OUT THE INVENTION

Reference will now be made in detail to the preferred embodiments of the invention, a online gaming architecture, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

This is a description of an embodiment of an Online Gaming Network herein referred to as the System.

CLIENTS AND SERVERS

Figure 11:
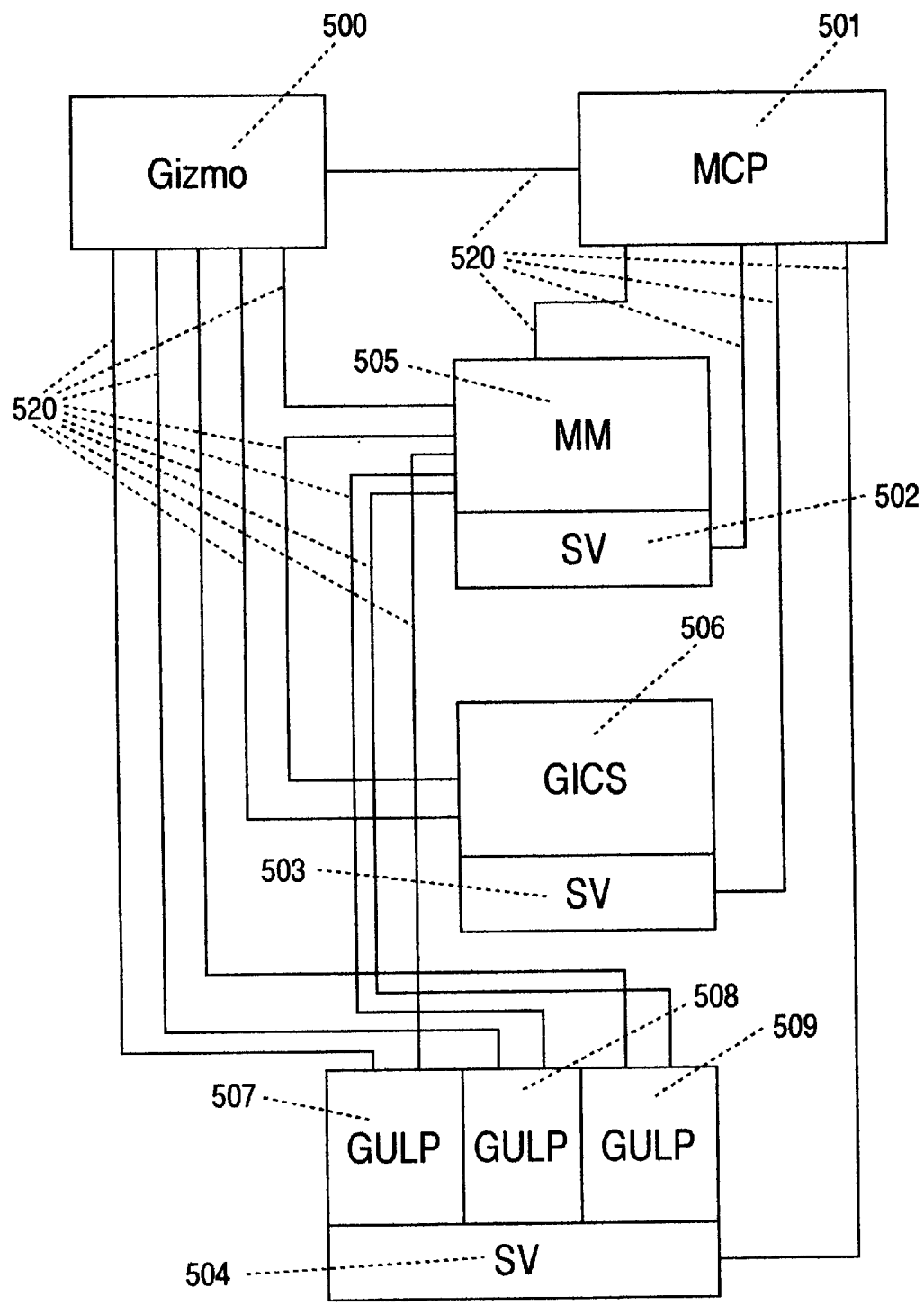
FIG. 11 is a block diagram of one embodiment of a computer network system online gaming architecture that facilitates the connection of players and authentication of their identity.

Referring to FIG. 11, a Client Program 500 is shown together with a number of Server Programs 501 through 509. Wherever the boxes representing Server programs touch (such as for example 502 and 505), this indicates that those Server programs necessarily reside in the same physical computer. Lines 520 are drawn to show the logical channels of communication between the Client Program 500 and the various types of Server programs 501 through 509. The names of the various types of Server Programs are: Master Control Program (MCP) 501, Servorum (SV) 502, 503, 504, Matchmaker (MM) 505, Game Instances Class Server (GICS) 506, and Game Upper Level Protocol Servers (GULP) 507, 508, 509. Only one type of Client Program is shown, the Gizmo type 500. Only the logical channels of communication shown are used. The purposes of the various Server and Client programs are explained hereinafter.

GIZMO

Figure 1:
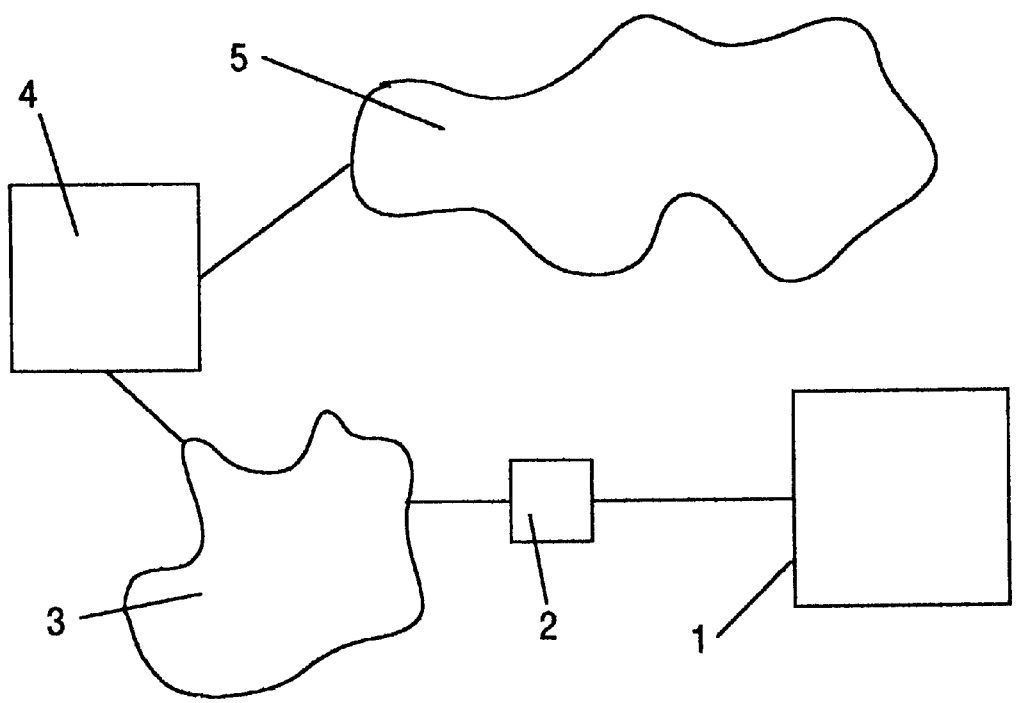
FIG. 1 shows a prior art internetwork connection of a client computer system in a client/server architecture.
Figure 2:
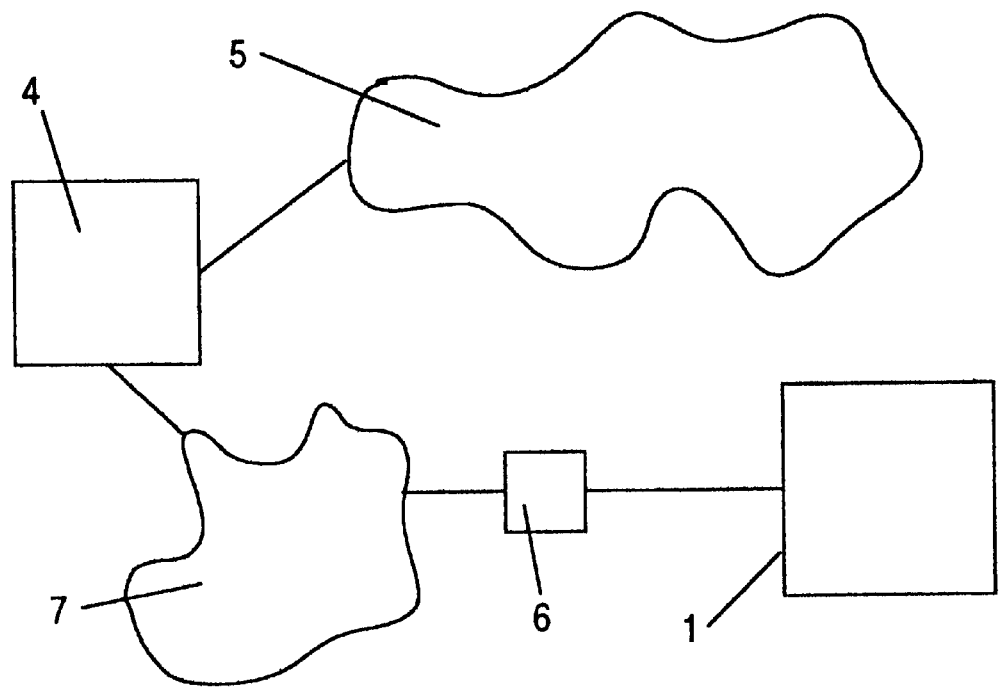
FIG. 2 shows an alternative arrangement prior art internetwork connection of a client computer system in a client/server architecture.
Figure 3:
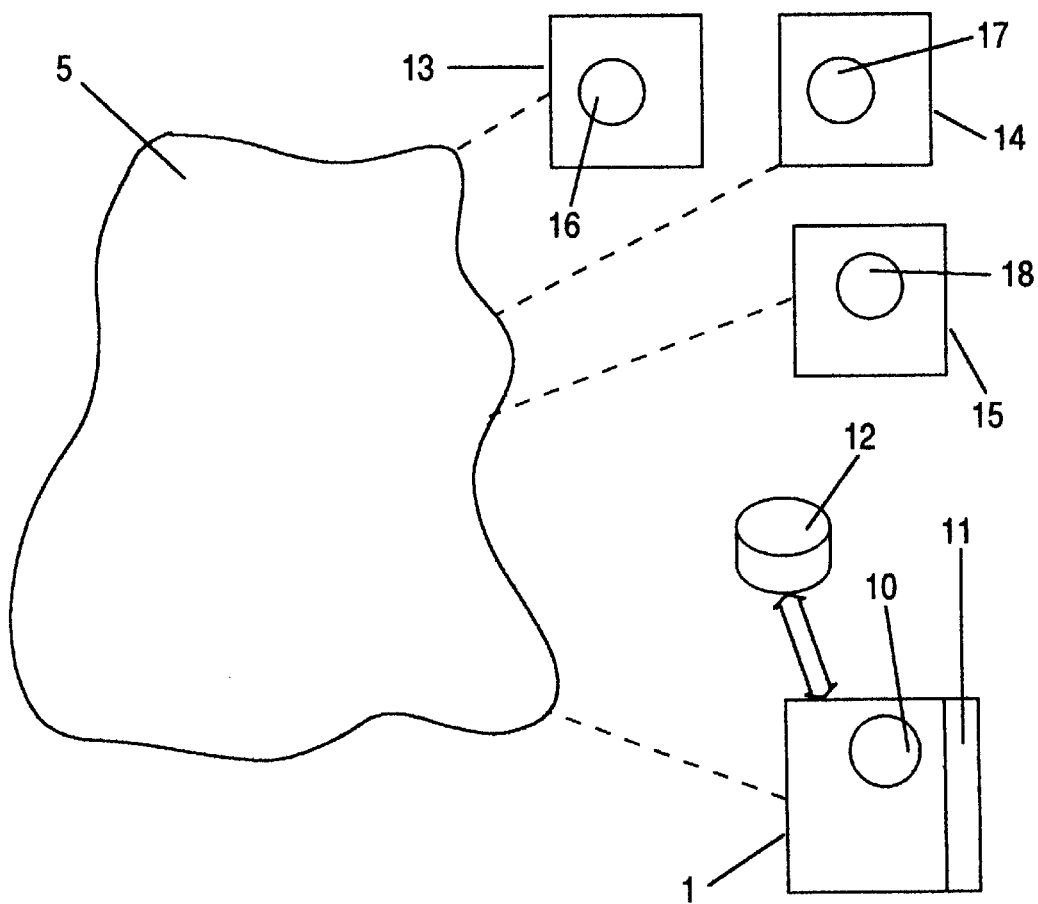
FIG. 3 is a schematic of a client computer configured to run a gaming program in an online gaming architecture of embodiment of the present invention.

Referring to FIG. 3, in which for the sake of clarity Modem TA PSTN and ISDN are all omitted, the Client 1 runs a computer program, herein termed the Gizmo 10, that provides a human interface 11 consisting of at least a video display and an input device such as a keyboard. The Gizmo is further able to exchange data messages with other computers (not shown) that are also attached to the Net. Configuration files 12(MPIs) which are held locally in non-volatile storage on the Client are read by the Gizmo. Such non-volatile storage is typically implemented as a shared disk drive device and supporting electronic and software components.

MCP

Referring again to FIG. 3, the MPIs provide the Gizmo with, inter alia, the well-known Net address or addresses of one or more Server computers 13, 14, 15 that run Master Control Programs (MCPs) 16, 17, 18. Server computers per se are well known in the art. None of the MCPs reside on the Client, or indeed on any Client used by any prospective gamester, rather each MCP resides on a Server computer (also known more simply as Server) that is located remotely from the Client. Servers are typically computers which are not attended by any person but which are accessible via the Net for the interchange of data messages to and from any Client. In the System some Servers also interchange amongst themselves. In the typical case where the Net is the Internet, then the Net address is equivalent to the Transport Service Access Point (TSAP) and comprises the Internet Protocol (IP) Address together with the Internet Protocol Suite (IPS) Protocol Number and an IPS Port Number. TSAP, IP and IPS are each well known in the art. Any Net address may be encoded (with or without compression) in any convenient manner.

GIZMO ATTACHES TO AN MCP

Figure 4:
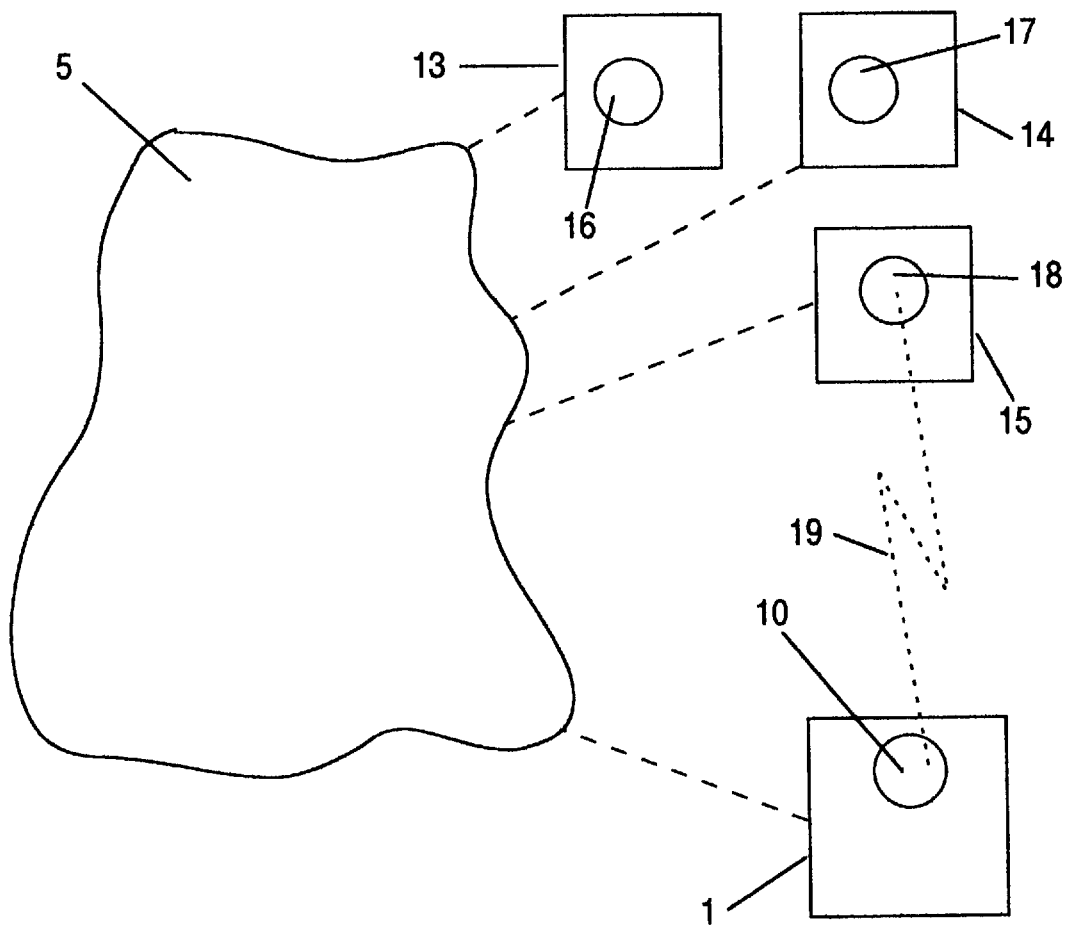
FIG. 4 is a schematic of a virtual link that is established in one embodiment of the present invention after between a client computer and an internetwork system.

Referring to FIG. 4, some components such as the Modem, PSTN and POP have been omitted for clarity. The Gizmo 10 having discovered the Net address of one or more MCPs 16, 17, 18 from one or more MPIs, attempts to open a connection with (or more briefly to attach to attach to), each MCP on the list in turn until a data communications virtual circuit 19 (or more briefly, herein, a link) is successfully established with an MCP. In telecommunications the term "virtual circuit" is sometimes used in a highly specific sense relating to a very few specific protocols, but in this specification the term "virtual circuit" is used in its alternative and more generic sense. The link is a logical connection rather than a physical connection, it is embodied as software states in the Gizmo, the POP, the Client computers, the MCPs and possibly in others also.

Figure 5:
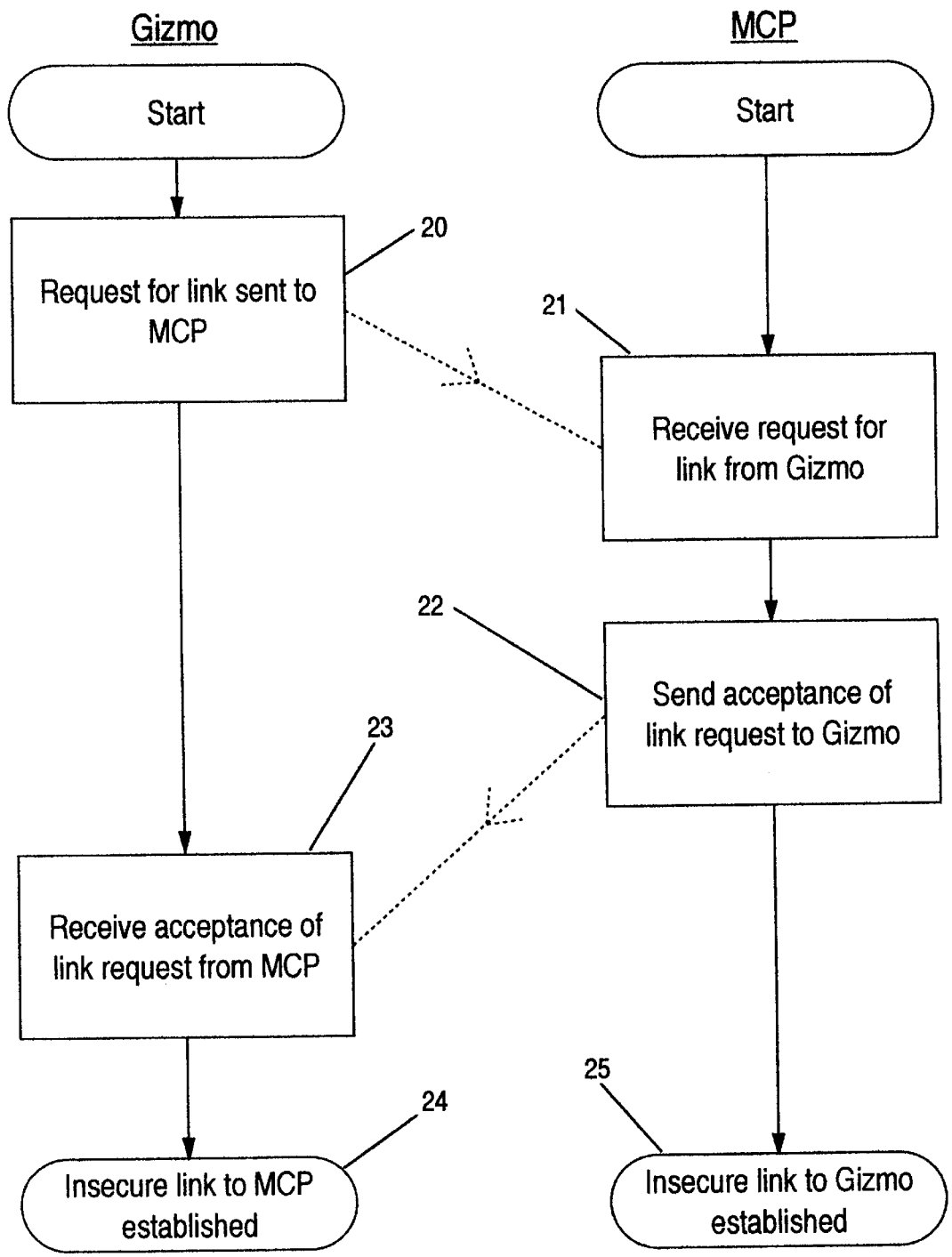
FIG. 5 is a flow chart illustrating steps of a process employed in one embodiment of the present invention for connecting a client gaming program to a master control program.

Referring to FIG. 5 the attachment procedure is shown in simplified form, in step 20 the Gizmo sends a request for a link to the MCP. In step 21 the MCP receives the request; and the MCP sends a message of acceptance back to the Gizmo (step 22). In step 23 the Gizmo receives the acceptance thus competing the establishment of an insecure link between Gizmo and MCP (shown as box 24 and 25).

The link is durable, that is to say it persists until one of the software components that support the link takes action to dismantle it; and in a timely manner thereafter all of the software states defining the link in the various software components that support the link vanish or become quiescent depending upon their individual embodiments.

ENCRYPTION

In order to protect the System from accidental or malicious damage due to incorrect messages being received, both checksums and encryption are utilized. Checksums and their benefits are well known in the art. Various types of encryption are also well known in the art, including public key and strong private key encryption. Public key encryption has the considerable advantage that it provides for the exchange of encryption keys over an insecure link and it can be as strong as strong private key encryption. Strong private key encryption has the considerable advantage that it requires fewer Microprocessor Unit (MPU) clock cycles and thus much less time to execute than does public key encryption. The System exploits the advantages of both public key encryption and strong private key encryption by using, in appropriate circumstances, the type of encryption that has greater or greatest advantage. In short, public key encryption is used to exchange private keys and private key encryption is used for most or all other purposes.

GIZMO AUTHENTICATION

Having established a link with an MCP the Gizmo must authenticate itself with that MCP before the Gizmo may use any of the services provided by the MCP (beyond services related to the authentication process itself). If the Gizmo has never previously authenticated itself with the particular MCP with which it has contact, then it needs to obtain a private key (PK) for the strong private key encryption method supported by that particular MCP.

Figure 6:
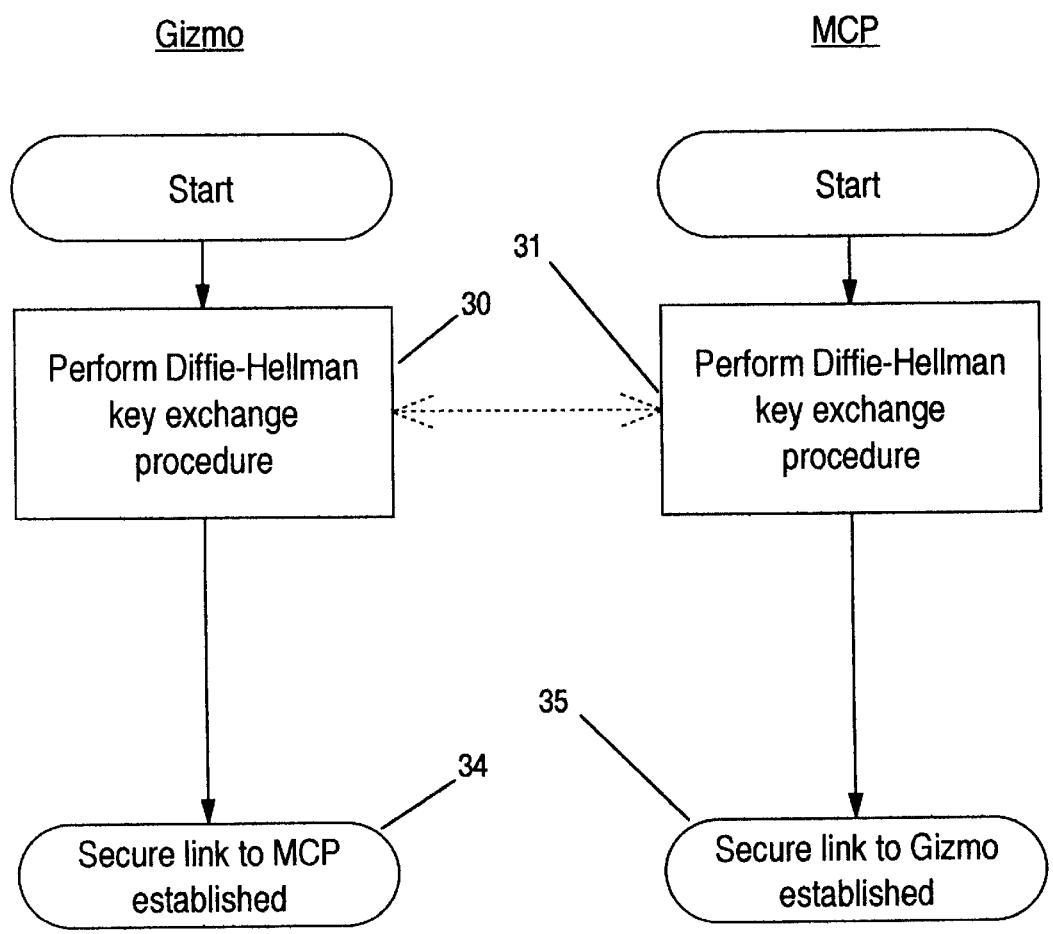
FIG. 6 is a flow chart depicting the steps of a process utilized in one embodiment of the present invention for establishing an encrypted connection between a client gaming program and a master control program.

Referring to FIG. 6, in steps 30, 31 (for Gizmo and MCP, respectively) the PK is obtained by some form of public key cryptographic exchange such as the prior art Diffie-Hellman key exchange procedure disclosed in U.S. Pat. No. 5,214,703 entitles "Device For The Conversion Of A Digital Block And Use Of Same." The PK is a strong private encryption key such as that of the well-known International Data Encryption Algorithm (IDEA). Upon completion of the key exchange the Gizmo has a PK and thus a secure link is created (steps 34, 35 for Gizmo and MCP, respectively) between the Gizmo and the MCP with which it is in contact and without the computational overhead of public key encryption. The MCP with which the Gizmo first successfully establishes a secure link is referred to as the initial MCP.

Figure 7:
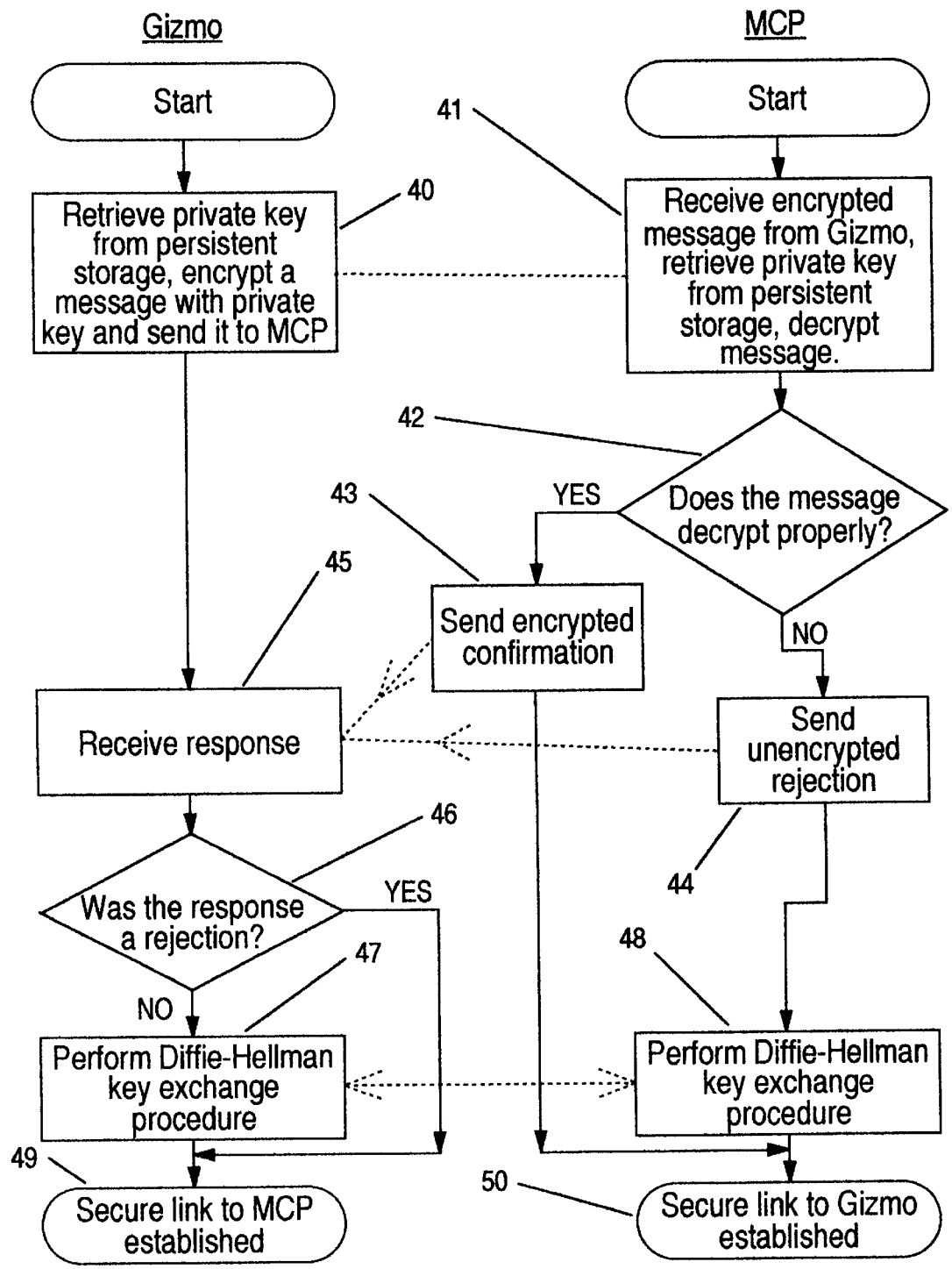
FIG. 7 is a flow chart showing the steps of a process utilized in one embodiment of the present invention that relies on previously established encryption keys to set up a secure connection between a client gaming program and a master control program.

If the Gizmo already has a PK (for that particular MCP) that was obtained during some previous authentication, then, referring to FIG. 7, the Gizmo attempts to use that PK for authentication (steps 40, 41, 42, 43, 44, 45) and if successful (step 46) it uses a new PK obtained from the MCP (in step 45) for use during the present session. If this attempt fails (a likely reason being that PK is either stale or forgotten by the said MCP) then the Gizmo falls back upon public key cryptographic exchange with the MCP to obtain a new PK (steps 47, 48). As previously suggested a public key cryptographic exchange (steps 47, 48) is more computationally intense and so takes much longer than a strong private encryption key exchange using a PK. The same PK is used for encryption/decryption for traffic passing both ways, so long as the PK remains in effect. As a result of the steps 40 through 48, the Gizmo and MCP have a secure mutual link (steps 49, 50).

USER LOGS IN

Next the Gizmo prompts the (human) user for account information, this comprises a player's name (or pseudonym since many gamesters prefer to use a nom de plume), and a secret password. Alternatively the user may request creation of a new account, in which case he may be prompted to provide billing information such as legal name and address. The account information is securely passed to the MCP which in turn communicates with still another Server (not shown in any Figure) that maintains and provides accounting data. Assuming the user's account information is approved, the MCP will so notify the Gizmo and will make any information associated with that user to any other Server that requests this information from the MCP (provided the requesting Server is authenticated with the MCP). The MCP maintains a database of information on the user and distributes copies of this database amongst all the MCPs for reasons of redundancy and resilience in the event of any form of MCP failure or other inoperability.

REPLACEMENT MCP IS CHOSEN

Figure 8:
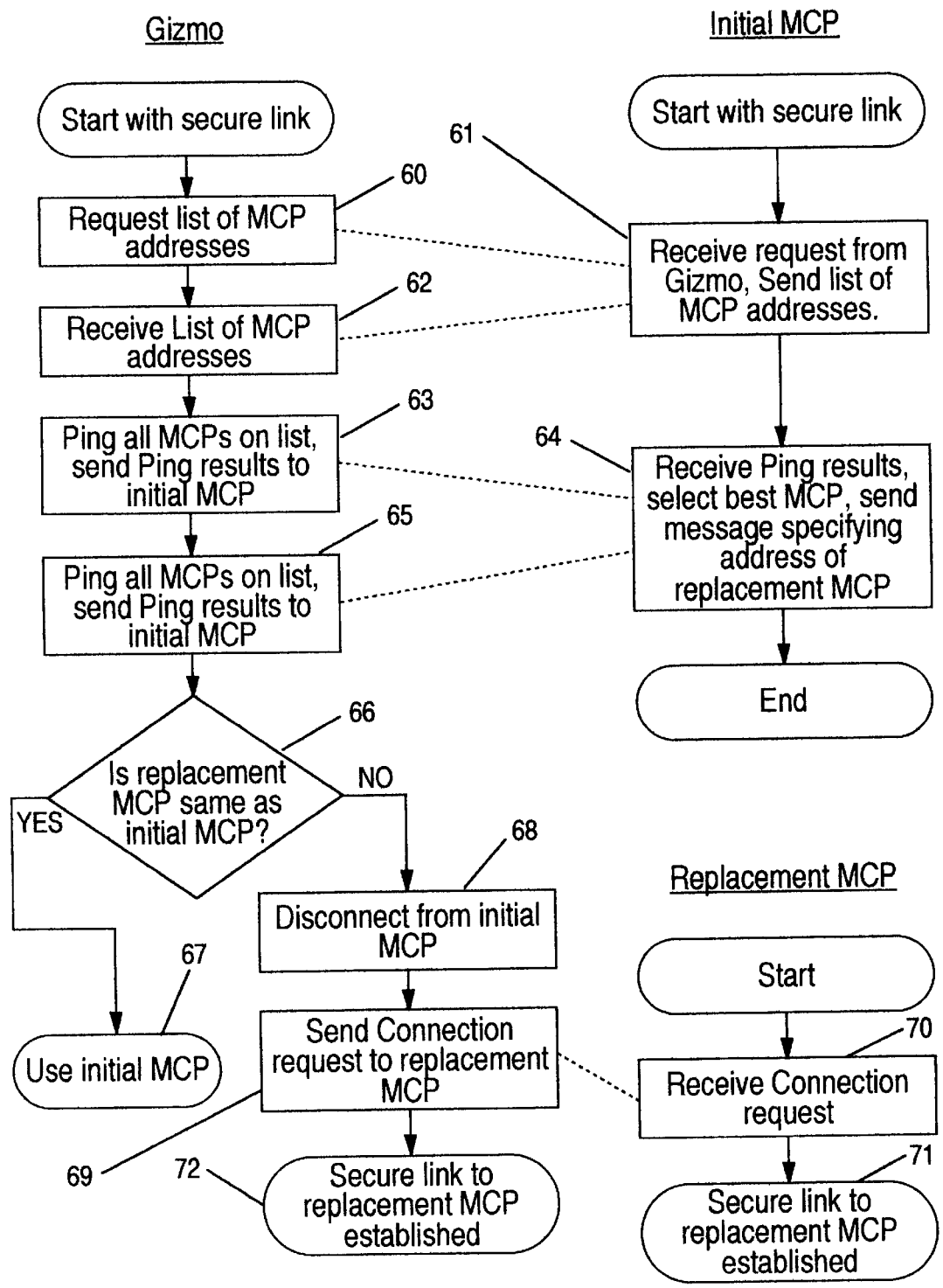
FIG. 8 is a flow chart of a process one embodiment of the present invention engages in to establish an efficient connection between a client gaming program and an initial master control program.

As a consequence of being authenticated with the initial MCP, the Gizmo is able to pass messages to and from the initial MCP both efficiently and securely. Referring to FIG. 8, regardless of how the Gizmo comes to be authenticated with the initial MCP, the Gizmo requests from the initial MCP a list of the Net addresses of all MCPs (step 60). All the MCPs continually maintain securely encrypted conversations amongst themselves so as to make every MCP aware of the Net addresses and operational status of all MCPs, this information being maintained to a reasonable degree of topicality. In step 61 the initial MCP sends a list of MCP addresses to the Gizmo. In step 62 the Gizmo obtains an updated list of MCP Net addresses from the initial MCP, the Gizmo stores the updated list in local non-volatile storage for possible future use.

Any MCP may have more than one Net address assigned to it. Multiple Net addresses for a single MCP typically occur when that MCP is Multihomed. Internetworks and multihomed servers such as MCP are discussed in U.S. Provisional Patent Application Ser. No 60/034,534, filed by Steven Grimm and Marc Kwiatkowski and entitled "Multihomed Network Computers," which is incorporated herein by reference.

The Gizmo determines the data packet transit time (also known as latency) to each MCP Net address in the list of MCP Net addresses, by using the Internet Protocol Suite (IPS) Ping protocol (step 63). The IPS Ping protocol is well known in the art. The information representing the latencies is passed securely to the initial MCP (also part of step 63) and they mutually enter into a negotiation as to which MCP the Gizmo should use for game rendezvous purposes (not shown in FIG. 8). The criteria for this negotiation include the latencies and believed operational condition and features of each MCP and other factors.

GIZMO CONNECTS TO REPLACEMENT MCP

Still referring to FIG. 8, if the replacement MCP is not the same as the initial MCP (step 66), the Gizmo next disconnects from the initial MCP (Step 68) and then establishes a new virtual circuit to the replacement MCP (step 69) that is to be used for game rendezvous and which is the MCP that was identified as a result of the negotiation with the initial MCP. This replacement MC is referred to as the present MCP. The Gizmo performs the session authentication procedure with the present MCP (not shown in FIG. 8 for simplicity). Once it is authenticated then the Gizmo enters into a secure dialog with the present MCP, in particular the Gizmo conveys to present MCP codes that represents the type or class of game that is desired. Certain other information will typically also be conveyed from the Gizmo to present MCP, especially information that was retrieved from the MPI. In the event that the Initial and replacement MCP are both the same MCP the new authentication is not required (step 67) but information from the MPI is still required to be passed to the MCP (not shown in FIG. 8 for simplicity).

MATCHMAKER

Figure 9:
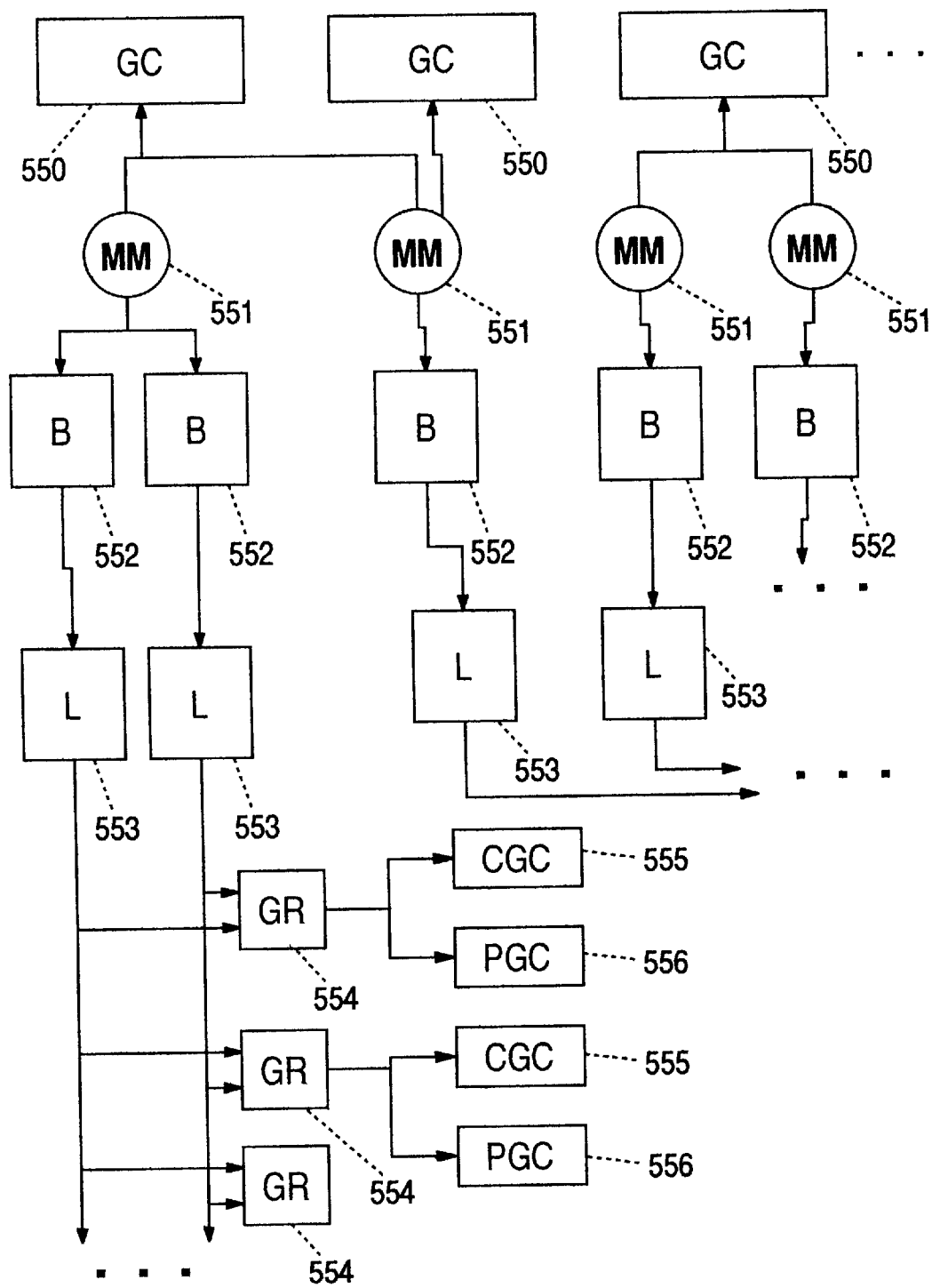
FIG. 9 is a block diagram showing the conceptual structure of software services provided one embodiment of a matchmaker program in the present invention.

Next the Gizmo is to become authenticated with yet another Server program, in this case it is a Server program called a Matchmaker (MM), but there are a number of prerequisites to this authentication. Matchmakers execute on a Server that does not host any MCPs. A Matchmaker provides (to Gizmos) services that support such operations as bringing players together and supervising game instances. These are termed rendezvous services. The conceptual structure of these software services provided by a MM is shown in FIG. 9. Referring to FIG. 9, there are an open ended number of Game classes (GC) 550, each game class is supported by one or more Matchmakers (MM) 551, and indeed some MMs support more than one GC. Closely associated with each MM and executing in the same Server computer are other software objects and these include: Buildings (B) 552, Lobbies (L) 553, Game Rooms (GR) 554, Chat Game Connections (CGC) 555 and Playable Game Connections (PGC) 556. Although a MM may consist of one or more Buildings (B), each B maps to precisely one Lobby (L). For each MM there is an open ended pool of Game Rooms (GR) which are shared by all Lobbies in that MM. Each GR is associated with precisely one CGC and precisely one PGC.

MMs exist primarily to provide services to Gizmos and for a Gizmo to be able to use the services of a particular MM, the Gizmo must become authenticated by the MM. One of the prerequisites of getting a Gizmo authenticated with a MM is that the MM object code must actually exist within an executing program. In particular an instance of the MM program needs to be running on a Server and that instance of the MM program needs to be configured so that it is willing and able to service the requests to be made by the particular Gizmo. Moreover, the MM must be configured to support the game type or class that the Gizmo has requested or the Gizmo will be unable to use that particular MM.

Additional features of MMs are disclosed in U.S. Provisional Pat. Appl. Ser. No. 60/013,812 entitled "Network Match Maker."

SERVORUM

In order to be able to cause instances of MM programs to be run, each MCP maintains a continual dialog with an instance of a particular Control Program known as a Servorum (SV). Each and every Server that is configured so as to be capable of running one or more MM program instances have (at all times that the Server is in an operational condition) precisely one Servorum (SV) running in that Server. The SV is responsible for initiating and sustaining dialog with every MCP that the SV is configured to be aware of. Although both MM and SV maintains their mutual dialog on a periodic basis, the SV is responsible for initial establishment of the dialog and subsequent reestablishment and recovery after possible loss of timely communication.

MATCHMAKER IS SELECTED

Figure 10:
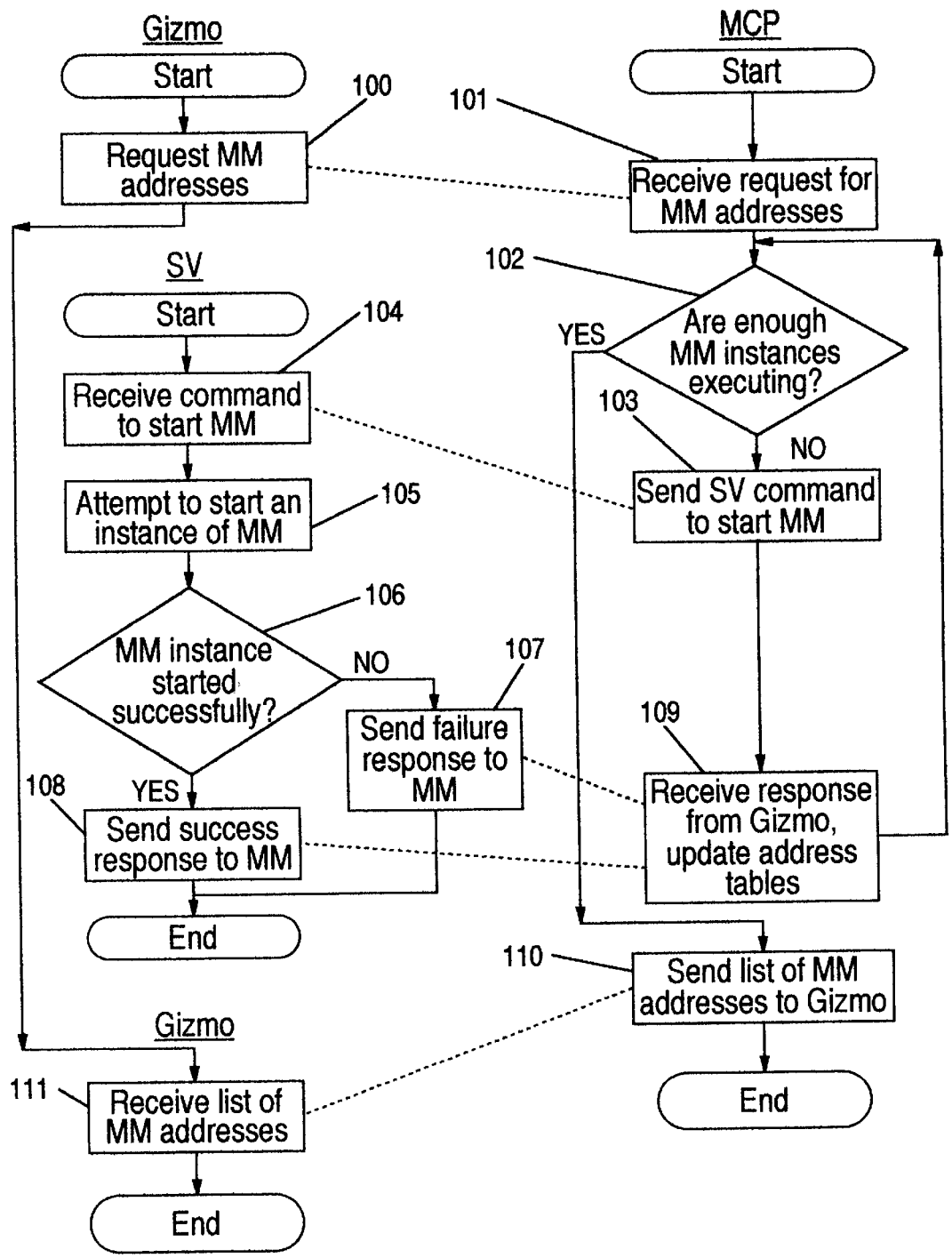
FIG. 10 is a flow chart illustrating the steps of a process used by one embodiment of the present invention to generate a list of sufficient matchmaker programs.

Referring to FIG. 10, the Gizmo initiates a request for a list of MM addresses (step 100) by sending a message that is received by the present MCP(step 101). In step 102, the present MCP makes a determination as to whether a sufficient number of suitable MMs exist for the Gizmo. This determination is based on a number of factors comprising: whether any MMs already exists, whether the MM is configured to permit the present MCP to command the MM to add support for additional types of games and so on. In step 102, if an insufficient number of MMs exist that are judged suitable by the previously mentioned criteria, in step 103 the MCP sends a control message to a SV to command the SV to cause a MM to start running (step 105) on the Server where the SV is located and to configure that MM to support the type or class of game sought by the Gizmo. In this embodiment it is likely that several or many MMs are available for use by the Gizmo. In step 110, a list of all of the Net addresses of all of the suitable MMs is conveyed from the present MCP to the Gizmo. The Gizmo receives this list of addresses (step 111).

The Gizmo conducts IPS Ping protocol tests to determine the latency from the Gizmo to each candidate MCP. The results of these ping tests are sent back to the present MCP which uses this information together with the previously mentioned criteria to make a final determination as to which MM the Gizmo is to use. The present MCP notifies the Gizmo of the Net address of the MM to use.

ADDITIONAL CRITERIA FOR MATCHMAKER SELECTION

SVs have further properties that can be exploited by MCPs both in creating the list of Net addresses that the Gizmo is to ping, and also in making the final selection of MM for the Gizmo to use. For example, SVs may be multi-homed as described in U.S. Provisional Patent Application Ser. No. 60/034,534. In the case the SV is multi-homed, it necessarily has a plurality of Net addresses that MCPs may take into account when selecting a MM for the Gizmo to use. Moreover, in order to reduce redundancy and generally streamline the selection process the SVs are assigned cluster numbers such that SVs which share a cluster number have a very similar set of network attributes. Thus, an MCP may avoid the need for the Gizmo to conduct the IPS Ping test on multiple MMs that share a cluster number, since it is reasonably certain that very close results would be obtained. A single IPS Ping test by the Gizmo is sufficient for an entire SV cluster. It is highly likely to be the case that all the SVs belonging to a cluster are co-located physically, and if multi-homed then they are all multi-homed to the same networks and in the same manner.

AUTHENTICATION WITH MATCHMAKER

At this stage in the method, the Gizmo is authenticated with the present MCP and the Gizmo needs to be authenticated with the MM that the MCP selected for the Gizmo to use. Since the Gizmo has already successfully conducted IPS Ping tests with the selected MM, there is a good probability that the Gizmo can at least exchange messages with that selected MM, and certainly a better probability than would be the case with a MM selected at random.

As a last resort the Gizmo can authenticate itself with the MM by means of sending a message to the MM using the Diffie-Hellman key exchange technique described above. However, it is desirable to have a faster means of authentication. The MM does not keep non-volatile keys for Gizmos like the MCPs do, so the MM cannot simply retrieve a private key from non-volatile storage to authenticate the Gizmo on such a basis. Instead the MM enlists the assistance of any MCP with which the MM is authenticated (i.e., with which it can communicate securely). Private keys are maintained only in MCPs and this has important beneficial security implications. Since security depends (at least in part) upon private keys' remaining uncompromised and since MCPs are typically much fewer in number than either MMs or Gizmos there are few points of relative vulnerability in the system in regards to private keys. Also, since the number of MCPs is severely limited, it becomes economically feasible to take extra security measures at those few points, measures such as physically securing the Servers from unauthorized access are economic. Moreover if it is discovered over time that additional security measures are needed then it is likely that those additional measures need to be implemented at the relatively few locations that have MCPs.

FAST GIZMO AUTHENTICATION

The fast Gizmo authentication with MM is implemented as follows: The link is initially regarded as insecure, although weak encryption is used to make life harder for any interlopers. The Gizmo sends a weakly encrypted message to the MM to inform the MM that the Gizmo holds a private key corresponding to the user logged onto the MCP, of course the user is also identified. It is important to realize that at this stage the private key is not sent, merely a notification that the Gizmo holds the key. The MM securely asks the MCP for a key pair, that is a random unencrypted code and the encrypted version of it (encrypted using the user's private key which is held by the MCP). The MM insecurely relays the unencrypted code to the Gizmo as a challenge, but retains the encrypted version of the code. The Gizmo encrypts using the private key and sends the result back to the MM. The MM can now compare the results of the Gizmo's encryption and the MCP's encryption of the same code, if they match then the implication is that the Gizmo knows the same private key for the MCP as the MCP knows for the Gizmo and the MM considers the Gizmo authentic. At this stage, both the MCP and the MM know the Gizmo to be authentic and the MCP (but not the MM) can communicate securely with the Gizmo. The final part of authentication is for a new session key to be generated. The MM sends to the MCP a command to generate a new private key for the Gizmo and the MCP sends the new private key to both MM and Gizmo, and so the Gizmo and MM can now communicate securely.

A benefit of negotiating a new private key is to limit the amount of time the private key held by the MCP is used, thus severely limiting the amount of data encrypted with any one key so impeding any brute force attack on the private key encryption and also limiting the period of validity of any possibly compromised key. All further communications between the Gizmo and the designated MM is conducted securely for the duration of the user's online session.

ROOMS

The MM next requests from the MCP, a copy of the database of volatile and non-volatile information kept on the user (account) that logged into the original MCP, this database of information is updated by any MCP and distributed amongst all MCPs by way of the previously described conversation that all MCPs mutually maintain.

The MM supports the abstract concept of Rooms which are an association of players which will potentially enter a playing instance of a game. The analogy with non computer games is that the players congregate in a room, discuss game rules, select teams etc., and then some or all of the players leave the room to form a game instance. For example in a room designated for contract bridge players that contains several players, precisely four may leave to form a game instance, or in other words to play a rubber since the game is contract bridge. Similarly players would pair off in rooms for chess players or would form two teams of eleven and then leave in a room for soccer players. The Gizmo requests the MM to attach the Gizmo to a room for a particular type or class of game.

LOBBIES

In fact the Gizmo is initially attached to a special kind of room which is termed a lobby. There is a least one lobby per type of game that can be requested. Conceptually the lobby is treated as supporting a type of game. However, the lobby's game is always a chat game rather than the type of game that the Gizmo requested. A chat game is not really a game in the ordinary sense of the word, it is rather a vehicle for supporting conversation and negotiation between a plurality of users. This chat game requires still more Server programs to provide user to user communication of such things as typed text messages, digitized sound streams representing comments spoken into a microphone by the users, and game specific parameters that refine the definition of the type of game to be played. These further instances of Server programs that enable games (including the chat game) are known as Game Instance Class Servers (GICSes in the plural or GICS in the singular). GlCSes are potentially clustered in a similar manner to MMs, and typically reside on still other Server computers.

GICS FOR LOBBY

In the present embodiment, whenever a lobby room is to be used, the Gizmo requires access to the following a Chat GICS. Given that the Gizmo wishes to use a particular lobby room that corresponds to the type of games to be played (and perhaps other properties), the MM must make a determination as to which GICS the Gizmo is to use to support the lobby room. In particular the MM must keep track of the GICSes available to each lobby. If the user's Gizmo is not the first Gizmo to enter a particular Lobby then the GICes for that Lobby will already exist and the MM can pass the Net addresses of the GICS or GICSes to the Gizmo.

GICS CREATION

If no Gizmo has previously entered the subject Lobby then there will be no GlCSes for that Lobby known to the MM so the MM must take action to cause one or more GICSes to be created. The following is a description of how the MM causes GICSes to be created: Servers, such as GICSes, are created as a result of commands sent to SVs. Every SV authenticates itself with every MCP and SVs accept commands to create Servers only from MCPs. Thus, since the Gizmo needs access to GICSes and only the MM knows which type or types of GlCSes the Gizmo needs, it is necessary for the MM to relay to the present MCP a list of the types (and quantities) of Servers required. The MCP returns to the MM a list of possible SVs and the MM passes this list to the Gizmo which conducts IPS Ping tests to determine the Gizmo's latency to each SV. The Gizmo then passes the Ping test results to the MM which forwards the results to the MCP. Armed with the Ping test results and the status of each SV (every MCP always knows a fairly current status of each SV because the SVs report into every MCP periodically), the MCP is able to select the SV to be used and (if necessary) commands the SV to start the needed GICSes running. The list of Net addresses of the GICSes is then passed back to the MM which passes that same list to the Gizmo. As a matter of expediency the MCP typically precreates a few of the most popular types of GICSes in anticipation of demand for them, and as a consequence the MCP is able to respond to requests for Net addresses of appropriate GICSes by returning a list of Net addresses of precreated GlCSes which is a fast and therefore responsive thing to do. In the event that there be an insufficient supply of pre-created GICSes, the MCP can always create a few more, and indeed after pre-created GICSes have been allocated the MCP may, at its leisure so to speak, replenish the supply by creating more. Indeed the MCP may adjust the supply of pre-created GICSes based upon demand history in an attempt to anticipate demand more efficiently.

Regardless of whether the MM was able to supply the Net addresses of GICSes already in use (by another Gizmo that is attached to the same lobby), or whether the MM had to cause new GlCSes to be created, the MM can pass a list of Net addresses to the Gizmo. The Gizmo in turn authenticates itself with the GICSes, and the GICSes use the services of the MCP to perform authentication in the same manner as the MM was able to authenticate the Gizmo as described above.

LOBBY CHAT AND GAME ROOMS

All of the players in a particular Lobby may engage one another in conversations using typed messages, icons representing persona, and the like. As the name suggests, a primary purpose of Lobbies is a place from which player may move to other rooms, these rooms being game rooms of the type alluded to earlier wherein players' congregate and leave to form playing game instances. While the user is associated with a Lobby, they may view information about game rooms that are attached to that Lobby, such information being for example, the name given to the room, the number of players presently in the room, and some indication of the Gizmo's latency to the GICS that is supporting the corresponding game room. The user may also stimulate the Gizmo to cause the Gizmo to become detached from the Lobby GICs and instead attached to one of the game room GICes, this is termed entering a game room. The method of attachment to the game room is carried out under the supervision of the MM and is very much like the attachment of the Gizmo to the Lobby GICS, except that the type and number of GICSes required is determined from the requested game room class database information rather than from the characteristics of the special Lobby game (a Lobby is not really a game but it is handled like a game from as regards GlCSes).

A user may also stimulate the Gizmo to cause a room to be created, in this case the MM contacts the MCP requesting the MCP to use SVs to cause a game room GICS to be created in a very much similar manner to how the Lobby GICS was created.

GULP

There is yet another type of Server used and it is termed a GULP (for Game Upper Level Protocol Server). There are two manners in which GULPs come into existence. Firstly when a GICS is created, a Shell script controls execution of programs and the Shell script directs the GICS to create certain GULPs. Shell scripts are well known in the art. A second source of GULPs is that any Gizmo which is authenticated with the GICS may command the GICS to have a GULP created with a particular set of properties.

GULP CREATION

GULPS are caused to be created by a GICS in much the same manner as an MM creates GICSes. That is the GICS commands the MCP to create GULPs. However the method for creating GULPs is a little different in that it is desirable for reliability reasons not to involve too many Server computers once the game is launched. Therefore the GICS initially requests the MCP to create the GULPs on the same physical computer as the GICs is located. If this is not possible to do without overloading the Server there is a conversation between the MCP, the GICS and the Gizmo to decide where the GULPs. The most important criterion in deciding where to place the GULPs is that they should be in close proximity (both in a physical sense and a Net topology sense) to the GICS. Failing that the GULPs are placed all in the same location and in a location with good IPS Ping results as measured by the Gizmo.

TYPES OF GULP

Thus, a game room is associated with a so-called Chat GICS and the Chat GICS owns several GULPs. In particular for a Chat GICS the types of GULP are: a speech GULP, a text GULP, a scribble GULP, a game settings GULP. The speech GULP is used to multicast digitized encoded sound data that represents the speech spoken by a user into the microphone attached to his computer. A text GULP multicasts the text that each user types in to all the Gizmo serving the other users in the room. Similarly a scribble GULP allows for freehand drawing on a shared whiteboard. And the game settings GULP is used to communicate with game class specific programs residing in the Gizmo to allow for the negotiation of game parameters for example smooth or rough terrain for a racing game. The game settings GULP also maintains the consent status of players, when a player is satisfied with the game settings he consents to play. Once a correct number of players have consented a game instance may be launched as a result of one of the players commanding his Gizmo to have this set in motion.

GAME LAUNCH

When a game instance is launched the GICS supporting the game room remains running but another GICS is created to support the game instance. This creation of the game instance GICS is very much like the creation of the game room GICS except that the type of GICS to be created is determined by the data associated with the game class and also the negotiated game parameters.

Typically there will be at least one GULP to multicast the game data amongst the players, unless the game uses a Client-Server model. Client-Server models are well known in the art. In the event that the game is of the Client-Server type then one of the GULP will be the entire Client part of the game program itself. In this Client-Server case the entire game modeling is performed in the GULP and that can be a significant load of the Server computer.

Game launching also comprises launching the game program executable on the Client computer (the computer upon which the Gizmo is running). The game executable sends and receives data by to and from the Gizmo and Gizmo in turn forwards the game data to and from the appropriate GICS or GICSes.

GAME PLAYING

While the game is playing there are periodic communications between: the MM and the Gizmo, the MM and the GICS, the GICS and the GULPs and of course a great deal of game data is exchanged between the Gizmo and the GULPs at frequent intervals. The MM remains part of the ongoing communication so that it can detect when the game ends and, at that time, reconnect the users to the game room from whence they came. In addition the MM detects the end of the game for billing purposes and updates the MCP accordingly. At normal termination of a game the players are returned by the MM to the game room and may negotiate a new game instance.

UNANTICIPATED DISCONNECTIONS

Since on many Nets communications can be lost without notice it is possible that a game will end prematurely. In particular if the Gizmo cannot communicate with the GICS or cannot communicate with the GULPs then the game cannot ordinarily continue for that player, though it may continue for the other players with one player dropped out (this is possible only for some types of game, for example it is not possible to play "Solo Whist" with any number of players other than four). However the MM has a measure of redundancy in that it can continue to supervise the game and watch for the end of the game if it can communicate with either the GICS or the Gizmo. If the MM loses communication to both GICS and all the Gizmos in the game Gizmo then the game is ended from a billing standpoint and the MM updates the MCP and destroys the game room. Similarly, if the MM loses communication to the GICS and some (but not all) of the Gizmos then the game is ended for those Gizmos.

GICS RELOCATION

In the case that the GICS does not reside on the same computer as the GULPs and the Gizmo loses communications with the GULPs, it is possible in for new replacement GlCSes to be created by the MM and all Gizmos are directed by a message sent from the GICS to disconnect from the old GULPs and connect to the new GULPs in order to continue the game. The MM can successfully replace the GULPs only if it has the state information for the game that was held by the old GULPs. This is a lot easier for a peer to peer game that has little or no state information in the GULPs than for a Client-Server game where the entire game state resides in a GULP alone.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A networked computer online gaming system, comprising:
    a network comprising at least one server computer in communication with a client computer adapted to run a client program, said network adapted to run server programs including a first server program that governs access of said server programs in said online gaming architecture, a second server program for creating instances of a server program, a third server program that supports rendezvous services, and a forth server program that enables data communication for at least one of said server programs, wherein said second server program:

accepts commands to create servers only from said first server program;

causes said third server program to start executing on a physical server that executes an instance of said second server program in response to a control message from said first server program and to configure said third server program to support the type or class of game sought by said client program; and create said fourth server program as a result of commands sent to said second server program from said first server program.

2. The networked computer online gaming system of claim 1 wherein said forth server program further provides user to user communication.

3. The networked computer online gaming system of claim 2 further comprising:

a fifth server program that supports the user to user communication; and a further server computer that executes an instance of said fifth server program.

4. The networked computer online gaming system of claim 1 wherein said first server program is adapted to:

establish a virtual link with said client program and authenticate said client program;

maintain a database of information on a user and make it available to another authenticated server upon request; and receive latency information and enter into negotiations regarding latencies between said first server program and said client program.

5. The networked computer online gaming system of claim 1 wherein said first server program is adapted to:

utilize encryption that both said client program and said first server program recognize;

maintain private keys for encrypting coded messages and provide said third server program with a key pair comprising a random unencrypted coded message and the encrypted version of the same coded message;

generate a new private key upon request by said third server program;

authenticate said second server programs and generate commands to create servers;

receive a list from third server program that sets forth the types and quantities of required servers;

precreate a popular type of said fourth server program in anticipation of demand for it and return a list of net addresses of said precreated fourth server program to said third server program; and create fifth server programs on the same physical computer as said fourth server program is located in response to requests from said fourth server program.

6. The networked computer online gaming system of claim 1 wherein said second server program is an instance of a particular control program that authenticates itself and maintains frequent dialog with said first server program, said second server program is responsible for initial establishment of said frequent dialog and subsequent reestablishment and recovery after possible loss of timely communication.

7. The networked computer online gaming system of claim 1 wherein said third server program:

is executed on a server computer that does not host said first server program;

ensures said client program is authenticated; and provides rendezvous services to said client program, said rendezvous services being adapted to bring players together and supervise game instances.

8. The networked computer online gaming system of claim 7 wherein said rendezvous services are implemented in a structure of software objects comprising:

a playable game connection;

a chat game connection that is associated with said playable game connection, said chat game connection comprising correspondence between users;

a game room associated with said chat game connections and said playable game connections, said game room being an association of players who will potentially enter a playing instance of a game;

a lobby associated with said game room, said lobby supporting a chat game and provides information about and access to said game room;

a building mapped to said lobby; and a game class shared by said lobby, said game class being supported by said matchmaker.

9. The networked computer online gaming system of claim 7 wherein said third server program:

ensures said client program is authenticated by executing an instance of said third server program running on said server; and said third server program is further configured to support the game type or class that said client program has requested and for which said third server program object code actually exists within an executing program.

10. The networked computer online gaming system of claim 1 wherein said client program:

causes a game room to be created by directing said third server program to request said first server program to command said second server program to cause an executing instance of said fourth server program to be created; and requests said third server program to attach said client program to said game room for a particular type of game.

11. The networked computer online gaming system of claim 10 wherein said fourth server program comprises:

a sixth server program to support said game room; and a seventh server program to support said game instance, the type of said seventh server program is determined by data associated with the game class and also the negotiated game parameters.

12. The networked computer online gaming system of claim 3 wherein said fourth server program:

uses said first server program to authenticate said client program; and provides typed text messages, digitized sound streams, and game specific parameters that refine the definition of the type of game to be played.

13. The networked computer online gaming system of claim 3 wherein said fifth server program comes into existence under the direction of a shell script that is created when said fourth server program is created.

14. The networked computer online gaming system of claim 3 wherein said fifth server program is created by said client program requesting said fourth server program to command said first server program to create said fifth server program.

15. The networked computer online gaming system of claim 3 wherein said fifth server program:
   is placed in close proximity in both a physical sense and net topology sense to said fourth server program such that the location has good Internet Protocol Suite ping results as measured by said client program;
   multicasts the game data amongst the players when the game is not using a client server model; and
   is the entire client part of a game program that performs game modeling when a game is a client/server type.

16. The networked computer online gaming system of claim 3 wherein said fifth server program comprises:
   a speech fifth server program;
   a text fifth server program that multicasts the text that each user types into said client program serving the other users in the room;
   a scribble fifth server program that allows for freehand drawing on a shared whiteboard; and
   a game settings fifth server program used to communicate with game class specific programs residing in said client program that permit the negotiation of game parameters, said game settings fifth server program also maintains the consent status of players.

17. A networked computer online gaming system, comprising;
   a network comprising at least one server computer in communication with a client computer adapted to run a client program, said server computer adapted to run server programs including a plurality of first server type programs that govern access of said server programs in said online gaming architecture, a plurality of second server type programs for creating instances of said server programs, a plurality of third server type programs that support rendezvous services, a plurality of fourth server type programs that enables data communications for at least one of said server programs, wherein said plurality of first server type programs comprises:
      an initial first server type program that maintains a list of net addresses of said plurality of first server type programs, said list is updated based upon frequent communications between each of said plurality of first server type programs; and
      a replacement first server type program that is selected from said list said initial first server type program maintains, said replacement first server type program being based upon communication links between said replacement first server type program and said client program.

18. The networked computer online gaming system of claim 17 wherein said first type server programs:
   make a determination as to whether a sufficient number of said third server type programs exist for said client program;
   frequently maintain encrypted messages amongst first server type programs to ensure all first server type programs are aware of the net addresses and operational status of all other first server type programs;
   return a list of potential second server programs to said third server programs; and
   each one of said plurality of first server type programs have multiple addresses assigned to it.

19. The networked computer online gaming system of claim 17 wherein said second server type programs:
   have a plurality of net addresses that may be utilized by said third server type programs for said client program; and
   are assigned a cluster number, said second server type programs that have similar network attributes being assigned a common cluster number.

20. In a networked computer online gaming system including a server computer in communication with a client computer adapted to run a client program, said server computer adapted to run server programs including a first server program that governs access of said server programs in said online gaming architecture, a second server program for creating instances of a server program, a third server program that supports rendezvous services, a forth server program that enables data communications for at least one of said server programs, an online gaming process comprising the steps of:
   a) establishing a link between said client program and said first server program;
   b) determining communication latency characteristics between said client program and said first server program; and
   c) engaging said third server program in a configuration that supports rendezvous services, wherein step c) further includes the steps of:
      c1) requesting third server program addresses;
      c2) determining if enough third server program instances are executing;
      c3) attempting to start an instance of third server program;
      c4) establishing third server program started successfully; and
      c5) transmitting success response to third server program.

21. The process of claim 20, wherein step a) further includes the steps of:
   a1) sending a request from said client program for an insecure link to said first server program;
   a2) accepting said insecure link request from said client program by said first server program;
   a3) establishing an insecure link between said client program and said first server program;
   a4) performing a secure key exchange procedure between said client program and said first server program; and
   a5) securing a link between said client program and said first server program.

22. The process of claim 21 wherein step a) further includes the steps of:
   a10) retrieving of a private key from a persistent storage by said client program;
   a11) encrypting a message with said private key and sending said encrypted message and an unencrypted version to said first server program;
   a12) analyzing by first server program of said encrypted message from said client program by comparing it to a message decrypted by said first server program utilizing said private key retrieved from persistent storage by said first server program;
   a13) sending a response from said first server program to said client program, said response is an encrypted confirmation if said analyzing by said first server program indicates said unencrypted message from said client program is the same as said message decrypted by said first server program, and said response is an unencrypted rejection if said analyzing by said first server program indicates said unencrypted message from said client program is not the same as said message decrypted by said first server program;

a14) perform a secure key exchange between said client program and said first server program; and a15) secure a link between said client program and said first server program.

23. The process of claim 20 wherein step b) further includes the steps of:

b1) requesting a list of said first server program addresses by said client program from an initial first server program;

b2) sending said list of first server program addresses to said client program;

b3) pinging all of said first server program addresses by said client program and sending the results to said initial first server program;

b4) selecting a first server program address based upon the results of said pinging;

b5) connecting client program to said selected first server program; said connecting involving continuing to use said initial first server program address if it was the selected first server program address, said connecting involving disconnecting said initial first server program if it was not selected first server program address and coupling to said selected first server program address.

* * * * *